Feb. 21, 1939.   R. WRIGHT   2,147,942
METHOD FOR DETERMINING DIRECTIONAL ORIENTATION OF MATERIALS
Filed April 30, 1937
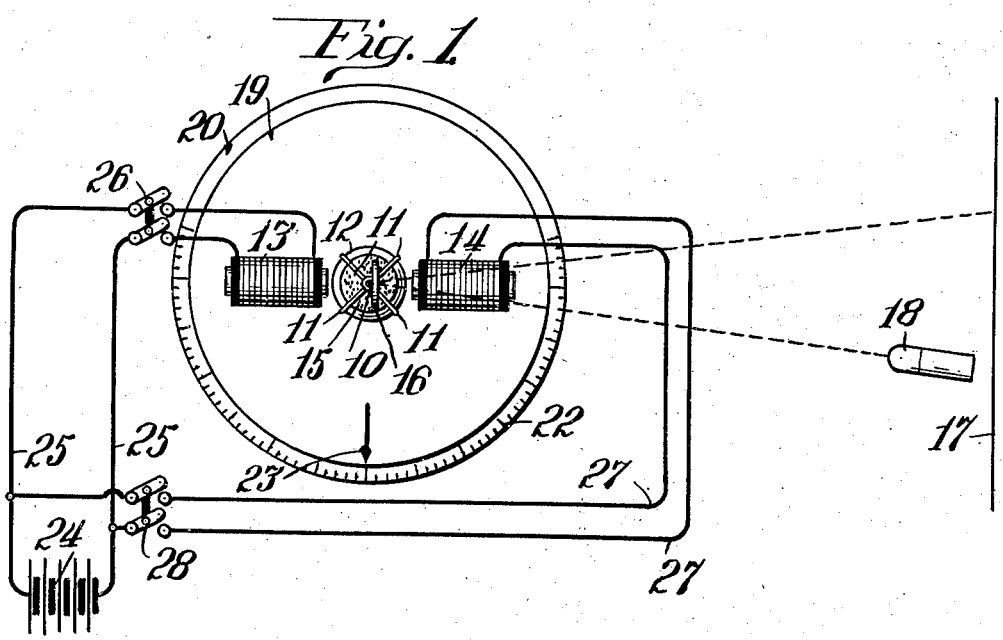
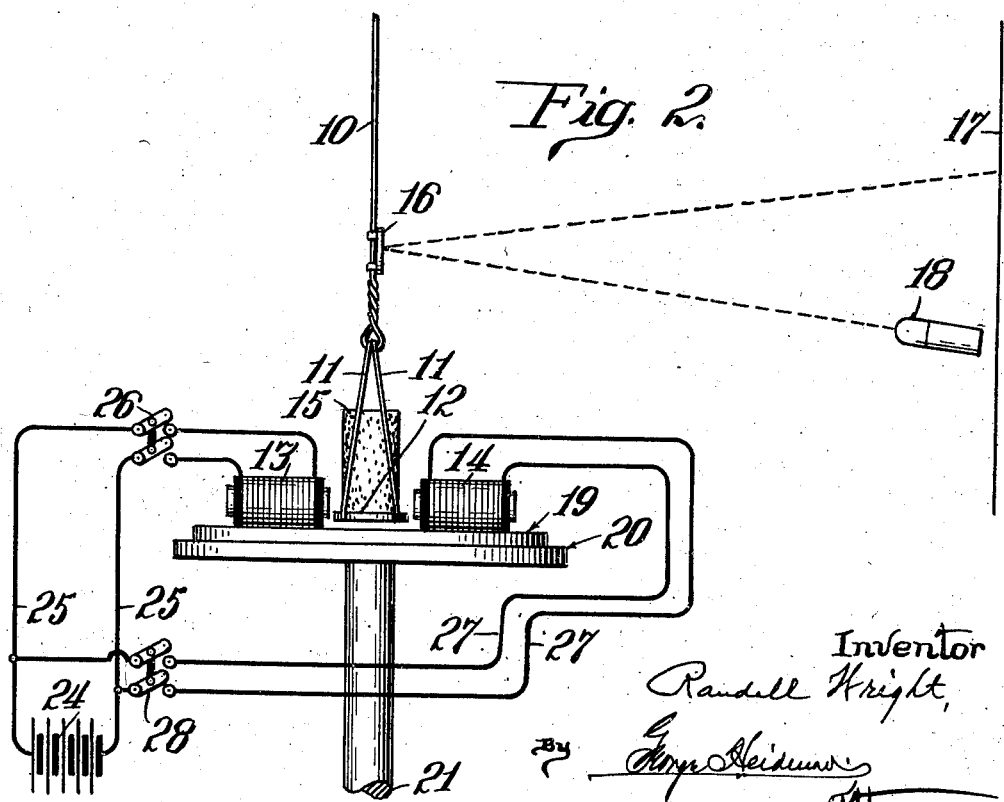
Inventor
Randall Wright,
By George Heidmann
Attorney Patented Feb. 21, 1939

2,147,942

UNITED STATES PATENT OFFICE 2,147,942

METHOD FOR DETERMINING DIRECTIONAL ORIENTATION OF MATERIALS

Randall Wright, San Buenaventura, Calif.

Application April 30, 1937, Serial No. 139,902

2 Claims. (Cl. 175—182)

My invention relates more particularly to the directional orientation of core samples taken from subsurface strata in the course of drilling and contemplates suitable apparatus whereby the magnetic polarity of the removed core may be utilized to orient the core with reference to direction and thereby determine the dip and strike of the earth's substrata or beds beneath the ground surface; the invention being especially adapted for use in oil or mineral drilling.

Certain parts of formations recovered with the core barrel in the course of drilling oil wells exhibit magnetic polarity. It has long been known that the earth's crust exhibits magnetic effects induced by the earth's magnetic field, the effects arising from the fact that most rocks or strata contain disseminated magnetic minerals which are magnetized by the earth's magnetic field.

My improved method consists in determining the directional orientation of magnetic or diamagnetic materials as, for example, a core sample taken from subsurface strata in the course of drilling for oil or for minerals, by causing the sample to orient itself under the influence of an electro-magnetic field.

Core samples taken from subsurface rocks or strata, if of proper nature, are known to have residual magnetism and, therefore, magnetic polarity which may be determined by my improved method and apparatus designed to practice the method as hereinafter described.

My improved method, more specifically stated, consists essentially in suspending the core or sample of material to be examined in such manner as to be as free as possible to turn under the effect of an electromagnetic field, in conjunction with means whereby the movement or turning of the core or sample will be indicated by a corresponding turn or change in the angle of reflection of a beam of light.

The invention and its objects will be more thoroughly comprehended from the detailed description of the accompanying drawing wherein:

Figure 1 is a more or less diagrammatic plan view of apparatus designed to carry out the method herein set forth.

Figure 2 illustrates the apparatus in elevation.

Apparatus designed to practice my improved method comprises a suitably suspended core or sample holder, a mirror or reflecting element, a suitable source of light for providing a directional light beam, and one or two electro-magnets. An exemplification of the apparatus is illustrated in the drawing and consists of a suitable cord 10 suspended from the ceiling of the room or from an overhead structure of an enclosure, with the lower end terminating in or provided with the diverging cords 11 whereby a suitable platform 12 is suspended from the cord 10. The platform 12 is of wood, cardboard, or some other non-magnetic material and the cords 11 are secured to the platform at or near the perimeter thereof.

It is essential, of course, that this suspension mechanism be as light in weight as possible and that the elements constituting this mechanism be of non-magnetic material, at least so far as the core or sample holding end of the mechanism is concerned; and the cord 10 should be of material offering minimum resistance to torsion in order that it, with the core holding platform 12, may readily respond to the magnetic action of the attendant electro-magnets indicated at 13, 14. In practice, it has been found that number 00 piano wire used for the upper suspending cord 10 gives very satisfactory results; while the lower cords 11 are to be of non-magnetic material.

The core sample, indicated at 15, should be placed on the platform 12 with its original top and bottom upwardly and downwardly, respectively.

The suspending element 10 at a suitable point is provided with a reflecting element or mirror 16 arranged parallel with the element 10 and also with a side wall indicated at 17.

Either one or two electro-magnets may be employed; in the exemplification two electro-magnets are shown at 13 and 14; and these electro-magnets are placed so that one pole face is in close proximity, say approximately one-half or three quarters of an inch of the suspended core sample 15. Where two electro-magnets are used as shown they are placed on opposite sides of the suspended core holding platform 12, in line with each other and with the respective pole faces preferably spaced from the core sample as previously stated; and the electro-magnets are so arranged and connected that the north pole of one is facing the south pole of the other with the platform therebetween.

The electro-magnets are of such electrical and magnetic constants as to be capable, when energized, of exerting sufficient electro-magnetism to turn a properly placed and polarized sample. These electro-magnets may conveniently be made of two hundred and eighty turns of number eighteen insulated copper wire wound on an iron bar seven inches long by one and one quarter inches in diameter.

Secured in some suitable manner between the mirror 16 and wall 17 is a light source generally indicated at 18, adapted to project a beam of light onto the mirror 16, whereby it is reflected onto the side wall; it being understood that mirror 16 is attached to cord 10 so as to turn with the sample or core holder 11, 12, with the result that the position of the reflection on the wall or other vertically disposed surface will correspondingly vary.

For the sake of convenience and to facilitate operation, I show the electro-magnets mounted on a platform or support consisting preferably of two superposed discs 19, 20, of wood or other non-magnetic material supported on a suitable post as at 21, with the upper end reduced and disposed through the lower disc 20 and pivotally supporting disc 19 so that the latter may be revolved; the axis of rotation of disc 19 being disposed directly in vertical alignment with the center of the suspension means and of the sample core.

The lower disc 20, which may be stationarily mounted, is shown of slightly larger diameter than upper disc 19; and the exposed peripheral portion of the lower disc 20 may be provided with graduations or degrees as shown at 22 in Figure 1; while the upper disc 19 may be provided with a pointer as at 23, see Figure 1.

Current for energizing the electro-magnet or electro-magnets 13, 14 may be from any suitable source as for example a battery indicated at 24 and capable of giving say from six to ten volts of direct current. The battery is shown provided with flexible leads 25, 25 connected with the coils of electro-magnet 13; the leads 25 being provided with a suitable switch indicated at 26 whereby flow of current to electro-magnet 13 may be controlled.

The leads 25, between the source of current supply or battery 24 and the switch 26, are tapped by flexible leads or wires 27 which are connected to the coil of electro-magnet 14; and these leads 27 are also provided with a suitable switch as at 28 for controlling current flow to electro-magnet 14.

In operation, the core sample is properly placed on the holder 12 in the manner hereinbefore mentioned and the holder brought to rest or substantially so. The light is then turned on so the beam of light strikes the mirror or reflector 16 and the position of the reflection of this light on the wall or vertical surface 17 is then noted. By reason of the length of the suspending element 10, there may be slight rotary oscillation of the core sample and holder and hence the notation must represent the extremes or end-points of such rotary oscillation. Current for the coils of the electro-magnets is then turned on by closing the switch or switches; and if there is a change in the position of the reflection or of the end-points of the reflection on the wall or vertical member 17, this is noted.

The electro-magnet or magnets are then de-energized by turning off the current by opening the switches and the position of the electro-magnet or magnets (when two are employed) is then changed with respect to the core sample. This may be accomplished by rotating the upper magnet holding disc 19 on the lower disc 20; the rotation being merely through a portion or arc of a circle. The current is again turned on and the new position of the reflection, or of the arc of the reflection, on the wall 17 is noted. The deflections arising during this procedure result from the turning of the core sample under the influence of the electro-magnetic field—the north and south poles of the electro-magnets adjacent to the core sample, of course, attracting the opposite poles and repelling the like poles of the core sample.

If, for example, the deflection of the reflection or of the end points of the arc of the reflection is to the operator's left on the first trial and to the operator's right on the second trial, then one of the poles of the sample lies between the positions of trial. This procedure is continued until such position of the electro-magnets is found where the electro-magnetic field causes no turning of the core sample. In this position the south pole of one electro-magnet directly faces the north pole of the core and the north pole of the other electro-magnet directly faces the south pole of the core when two electro-magnets are used, or when only one electro-magnet is used the pole (north or south) which faces the core will face the opposite pole (south or north) of the core.

A line is now drawn on the sample indicating its magnetic north-south orientation. From the known regional declination of the earth's magnetic field may be found the true north-south direction in the sample. The dip and strike may then be found by established means, and their orientation in terms of direction given. The attitude of the material from which the sample was taken (for instance the dip and strike of rocks or strata which have been cored in drilling) is then determined.

In the above description it has been assumed that the drill hole from which a core sample was taken is vertical. In some cases the course of the hole deviates somewhat from vertical. When, as is sometimes done, surveys of the course of the hole are made, adjustment of the dip and strike orientation in terms of the deviation of the hole from vertical can be made. In general such adjustments are not necessary, and orientations made by my improved method and apparatus will usually be accurate for all practical purposes unless the deviation is considerable.

With my method and apparatus herein described, the dip and strike of the bedding in the core samples may be determined; the attitude (dip and strike) of the cored rocks or strata may be determined; and the directional orientation of materials which retain residually the effects of former position in reference to the earth's magnetic field also may be determined.

The drawing exemplifies an embodiment of my invention and adapted for the method as defined in the specification and appended claims, but refinements are possible without, however, departing from the spirit of my invention.

What I claim is:

1. The herein described method which consists in suspending a core sample from above by a single yielding element with its original top and bottom disposed upwardly and downwardly and so it is free to rotate horizontally, subjecting the suspended core to the magnetic influence of energized magnetic means arranged adjacent the core so as to induce horizontal rotation thereof, noting the maximum point of rotary movement, deenergizing the magnetic means, arcuately repositioning the deenergized magnetic means relative to the sample and again energizing the magnetic means to induce rotation of the suspended core sample, noting the maximum point and direction of rotational movement relative to said first mentioned maximum point and the degree of deflection, again deenergizing the magnetic means and moving the latter horizontally through an arc about said suspended core sample to a point intermediate of the previously noted maximum points of rotary movements of the core sample where one of the poles of the magnetic means directly faces the opposite pole of the core sample.

2. The herein described method of determining the directional orientation of cored rocks or strata which consists in suspending the core by means of a yieldable element with its original top and bottom arranged upwardly and downwardly and the core free to rotate horizontally through the influence of a controllable magnetic field, noting the extreme point of rotational deflection of the core induced by said magnetic field, subjecting the core to the influence of a magnetic field disposed in a horizontal plane a predetermined distance from the first mentioned field, noting the maximum point of rotational deflection of the core induced by the second mentioned magnetic field and then moving the magnetic field to a point intermediate of the extremes of the two noted deflections where no further rotational deflection occurs.

RANDALL WRIGHT.